United States Patent
Strominger et al.

(10) Patent No.: US 7,776,958 B2
(45) Date of Patent: Aug. 17, 2010

(54) INVERSE EMULSION POLYMER AND METHOD OF USE THEREOF

(75) Inventors: Michael G. Strominger, Dekalb, IL (US); John T. Malito, Oswego, IL (US); Paul J. Harris, Orland Park, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 10/880,909

(22) Filed: Jun. 30, 2004

(65) Prior Publication Data

US 2006/0004130 A1 Jan. 5, 2006

(51) Int. Cl.
*C08L 91/00* (2006.01)
*C08K 5/10* (2006.01)
*C08F 2/32* (2006.01)

(52) U.S. Cl. ............... 524/801; 524/313; 524/318

(58) Field of Classification Search ............... 524/801, 524/313, 318
See application file for complete search history.

(56) References Cited

U.S. PATENT DOCUMENTS

| | | | | |
|---|---|---|---|---|
| 4,677,152 A | * | 6/1987 | Allen et al. ............... | 524/543 |
| 5,171,808 A | * | 12/1992 | Ryles et al. ............... | 526/264 |
| 6,686,417 B1 | * | 2/2004 | Reekmans et al. .......... | 524/801 |
| 6,838,514 B2 | * | 1/2005 | Yeung et al. ................ | 524/801 |
| 7,229,486 B2 | * | 6/2007 | Wiersema et al. .............. | 106/3 |
| 2003/0147825 A1 | * | 8/2003 | Chiarelli et al. .......... | 424/70.11 |

OTHER PUBLICATIONS

McCutcheon's Detergents and Emulsifiers, North American Edition, Allured Publishing Corporation, 1996.*
McCutcheon's Detergents and Emulsifiers, Interational Edition, MC Publication Co., 1982.*

* cited by examiner

*Primary Examiner*—William K Cheung
(74) *Attorney, Agent, or Firm*—Benjamin E. Carlsen; Michael B. Martin

(57) ABSTRACT

The present invention provides an inverse emulsion polymer having a dispersed phase composed of an aqueous solution of an acrylic polymer and a continuous phase composed of an ester of a fatty acid and a water-soluble alcohol. The present invention further includes a method of water treatment which includes adding the inverse emulsion polymer to an industrial water system and hydrolyzing the ester of a fatty acid and a water-soluble alcohol into a fatty acid salt. The inverse emulsion polymer may be used as a flocculant to clarify industrial water systems at elevated temperature and/or elevated pressure and high pH.

14 Claims, No Drawings

US 7,776,958 B2

INVERSE EMULSION POLYMER AND METHOD OF USE THEREOF

FIELD OF THE INVENTION

The present invention generally relates to an inverse emulsion polymer having a non-continuous phase composed of an aqueous solution of an acrylic polymer and a continuous phase composed of an ester of a fatty acid and a water-soluble alcohol, and in particular, to a method of water treatment including applying the inverse emulsion polymer to an industrial water system and hydrolyzing the continuous phase to a fatty acid salt.

BACKGROUND OF THE INVENTION

Inverse emulsion polymers are commonly used as polymeric flocculants for the separation of fine particulate matter suspended in a liquor or slurry obtained during mineral extraction. Inverse emulsion polymers are typically water-in-oil emulsions produced by a polymerization technique to form a finely divided aqueous solution of a water soluble polymer dispersed in an oil. Polymeric flocculants separate suspended particulate matter by coalescing the fine particles to form larger aggregates. The increased size of the aggregates causes the aggregates to settle at a reasonable rate, thereby clarifying the liquor. Purification of a liquid in this manner is accomplished by the process of sedimentation, which is typically conducted in large vessels (e.g., settlers or clarifiers) specifically designed for this purpose.

Conventional hydrocarbon-based or paraffinic-based polymer flocculants tend to have a deleterious effect on the liquor as well as on systems, equipment or processes downstream of the separation process. The hydrocarbon-based oil phase enriches the liquor with increased amounts of organic matter which impedes subsequent processing of the liquor. Furthermore, use of hydrocarbon-based polymeric flocculants in liquors and/or water systems at elevated temperature and/or elevated pressures is limited as the volatility of the hydrocarbon oil phase under such conditions carries substantial risk of explosion and contamination of the water condensate obtained during the mineral processing process.

A need therefore exists for an inverse emulsion polymer that does not adversely effect the quality or retrieval of a subsequent product from a water system or liquor to which the emulsion polymer is applied. A need further exists for a safe and effective inverse emulsion polymer for application to water systems or liquors at elevated temperature and/or elevated pressure.

SUMMARY OF THE INVENTION

In an embodiment of the present invention, an inverse emulsion polymer is provided having a non-continuous or dispersed phase composed of an aqueous solution of an acrylic polymer, a continuous phase composed of an ester of a fatty acid and a water-soluble alcohol, a surfactant, a low HLB emulsifier, and a high HLB emulsifier. The acrylic polymer may be composed of one or more monomers selected from the group consisting of (meth)acrylic acid and its salts, (meth)acrylate esters, (meth)acrylamide, N-hydroxy(meth)acrylamide and (meth)acrylamidosalicylic acid and its salts. Non-limiting examples of the ester of a fatty acid and a water-soluble alcohol include fatty acid methyl ester oils, soya oil, methylated soya oil, ethylated soya oil, methyl soyate, ethyl soyate, methyl palmitate, methyl stearate, methyl oleate, methyl linolate, methyl linolenate, laurate-based oils, castor oil, linseed oil, coconut oil, corn oil, cottonseed oil, neatsfoot oil, olive oil, palm oil, peanut oil, rapeseed oil, safflower oil, sesame seed oil, sperm oil, sunflower oil, tall oil, tallow, and combinations thereof.

In another embodiment, the present inverse emulsion polymer is used to flocculate suspended particles present in a mineral extraction system that is at elevated temperature and/or elevated pressure and high pH. As used herein, "high pH" means a pH of at least about 8 and typically in the range of about 12 to about 14. In this embodiment, the ester of a fatty acid and a water-soluble alcohol readily hydrolyzes to a fatty acid salt to produce a non-volatile by-product that imparts substantially no vapor pressure onto the system. In addition, the fatty acid salt separates with the flocculated particulate agglomerates to yield a clarified liquor having little or substantially no accumulated organic matter therein. This advantageously contributes to the retrieval of a subsequent mineral precipitate that has a higher level of purity as compared to mineral precipitates obtained from liquors clarified with conventional hydrocarbon-based flocculants.

In another embodiment of the present invention, a method of producing an inverse emulsion polymer is provided. The method includes adding an aqueous solution of one or more monomers selected from the group consisting of (meth) acrylic acid and its salts, (meth)acrylate esters, (meth)acrylamide, N-hydroxy(meth)acrylamide and (meth)acrylamidosalicylic acid and its salts to an oil phase containing an ester of a fatty acid and a water-soluble alcohol, a high HLB emulsifier, a low HLB emulsifier, and a surfactant; and initializing polymerization to form the inverse emulsion polymer.

Additional features and advantages of the present invention are described in and will be apparent from the following Detailed Description of the Presently Preferred Embodiments.

DETAILED DESCRIPTION OF THE PREFERRED EMBODIMENTS

The present invention generally relates to an inverse emulsion polymer, also referred to as an invertible water-in-oil polymer emulsion or a latex polymer. The inverse emulsion polymer of the present invention includes a non-continuous or dispersed aqueous phase composed of a solution of an acrylic polymer, a continuous phase composed of an ester of a fatty acid and a water-soluble alcohol, a low HLB emulsifier, a high HLB emulsifier, and a surfactant. The non-continuous phase is dispersed as micron sized particles within the continuous oil phase as is commonly known in the art.

The inverse emulsion polymer of the present invention may be prepared by initially dissolving one or more monomers selected from the group consisting of (meth)acrylic acid and its salts, (meth)acrylate esters, (meth)acrylamide, N-hydroxy (meth)acrylamide and (meth)acrylamidosalicylic acid and its salts to form an aqueous solution of the appropriate monomer or monomers.

As used herein, "(meth)acrylic acid" means acrylic acid or methacrylic acid, "(meth)acrylamide" means acrylamide or methacrylamide, "hydroxy(meth)acrylamide" means hydroxyacrylamide or hydroxymethacrylamide, "(meth) acrylate esters" means alkyl and aryl esters of (meth)acrylic acid and "(meth)acrylamidosalicylic acid" means acrylamidosalicylic acid or methacrylamidosalicylic acid. "AMPS" means 2-acrylamido-2-methylpropanesulfonic acid. Representative salts include sodium, potassium and ammonium salts.

In an embodiment, a chelating agent may be added to the aqueous solution. The low HLB emulsifier, the high HLB emulsifier and the surfactant may then be dissolved in the vegetable-derived oil. The aqueous solution may then be added to the oil phase to form an emulsion.

Polymerization may be initiated to form the acrylic polymer by free radical or redox polymerization as is commonly known in the art. In an embodiment, one or more free radical yielding initiators such as benzoyl peroxide, lauroyl peroxide, Vazo® 64 (2,2-azobisisobutyronitrile), Vazo® 52 (2,2-azobis(2,4-dimethylvaleronitrile), potassium persulfate and the like may be added to the emulsion to polymerize the one or more monomers to form the acrylic polymer. In an embodiment, Vazo® 64 and Vazo® 52 are used as the free radical initiators. The acrylic polymer may be prepared by polymerizing the appropriate monomers at from about 30° C. to about 85° C. over about 1 hour to about 24 hours. In an embodiment, polymerization occurs at a temperature of from about 40° C. to about 70° C. over about 3 to about 6 hours. A stabilizer may also be added to the emulsion to stabilize the polymer. In an embodiment, the stabilizer may be selected from the group consisting of a polyisobutylene derivative with polyoxyalkylene end groups, ammonium thiocyanate and combinations thereof.

The non-continuous phase of the inverse emulsion polymer may be an aqueous solution of an acrylic polymer. In an embodiment, the acrylic polymer may be a homopolymer or a copolymer composed of one or more monomers selected from (meth)acrylic acid and its salts, (meth)acrylate esters, (meth)acrylamide, N-hydroxy(meth)acrylamide and (meth)acrylamidosalicylic acid and its salts. In another embodiment, the acrylic polymer may be selected from the group consisting of poly(meth)acrylic acid, poly(meth)acrylic acid containing pendant hydroxamic acid groups, poly(meth)acrylic acid containing pendant salicylic acid groups, poly (alkyl (meth)acrylate), (meth)acrylic acid/alkyl (meth)acrylate copolymers, (meth)acrylic acid/(meth)acrylamide copolymers, (meth)acrylic acid/(meth)acrylamide copolymers containing pendant hydroxamic acid groups, (meth)acrylic acid/(meth)acrylamide copolymers containing pendant salicylic acid groups, (meth)acrylic acid/(meth)acrylamide/alkyl (meth)acrylate terpolymers, and (meth)acrylic acid/(meth)acrylamide/AMPS terpolymers. Thus, one of ordinary skill in the art will appreciate that the acrylic polymer may contain any combination, number and type of acrylamide, acrylic acid, and/or acrylate monomer.

The continuous phase comprises an ester of a fatty acid and a water-soluble alcohol. The ester of a fatty acid and a water-soluble alcohol may be derived from animal or vegetable sources or may be synthetic. In an embodiment, the ester of a fatty acid and a water-soluble alcohol is a fatty acid ester is derived from one or more $C_{12}$ to $C_{20}$ fatty acids and one or more water-soluble hydroxyl compounds, the hydroxyl compound being a monohydroxyl compound (e.g., monohydric alcohol) or a polyhydroxyl compound (e.g., glycerol). Preferred water-soluble alcohols are $C_1$-$C_4$ hydroxyl compounds. It is understood that the ester of a fatty acid and a water-soluble alcohol may be a mixture of different alkyl chain lengths and of differing degrees of saturation or unsaturation, depending on the source.

Non-limiting examples of suitable fatty acid ester oils may include fatty acid methyl ester oils, soya oil, methylated soya oil, ethylated soya oil, methyl soyate, ethyl soyate, methyl palmitate, methyl stearate, methyl oleate, methyl linolate, methyl linolenate, laurate-based oils, castor oil, linseed oil, coconut oil, corn oil, cottonseed oil, neatsfoot oil, olive oil, palm oil, peanut oil, rapeseed oil, safflower oil, sesame seed oil, sperm oil, sunflower oil, tall oil, tallow, and combinations thereof. In an embodiment, the continuous phase is composed solely of the ester of a fatty acid and a water-soluble alcohol. In a further embodiment, the ester of a fatty acid and a water-soluble alcohol is methyl soyate.

In an embodiment, the continuous phase is composed solely of a vegetable-derived oil.

In another embodiment, the vegetable derived oil is selected from the group consisting of a fatty acid methyl ester oil, soya oil, methylated soya oil, ethylated soya oil, methyl soyate, ethyl soyate, methyl palmitate, methyl stearate, methyl oleate, methyl linolate, methyl linolenate, laurate based oils and combinations thereof.

In another embodiment, the ester of a fatty acid and a water-soluble alcohol is selected from methyl and ethyl esters of $C_{16}$-$C_{18}$ fatty acids.

The low HLB emulsifier may have a hydrophilic-lipophilic balance (HLB) value in the range of about 1.5 to 7.5. In an embodiment, the HLB value of the low HLB emulsifier may be from about 2 to about 6. Suitable low HLB emulsifiers may include sorbitan fatty acid ester, ethoxylated sorbitan esters of fatty acids, and the like or mixtures thereof. In an embodiment, the low HLB emulsifier may be sorbitan monooleate, polyoxyethylene sorbitan monostearate, or a combination thereof.

The high HLB emulsifier may have a HLB value of from about 9 to about 16. Suitable high HLB emulsifiers may include polyoxyalkene sorbitan fatty acid esters as commonly known in the art. In an embodiment, the high HLB emulsifier may be polyoxyethylene sorbitan laurate, polyoxyethylene sorbitan palmitate, polyoxyethylene sorbitan stearate, polyoxyethylene sorbitan oleate, and combinations thereof.

The surfactant of the present inverse emulsion polymer may be composed of a polyoxyalkylene modified block copolymer as is commonly known in the art. In an embodiment, the surfactant may be oil-soluble/water-insoluble and have a polyhydroxy fatty acid hydrophobe group linked to a polyethylene hydrophile group. In a further embodiment, the surfactant may be a polyisobutylene derivative with polyoxyalkylene end groups suitable to stabilize the polymer in the emulsion.

Reduced Specific Viscosity (RSV) is an indication of polymer chain length and average molecular weight. The RSV is measured at a given polymer concentration and temperature as is commonly known in the art. The RSV value for the acrylic polymer of the present invention is at least about 10 dL/g, preferably at least about 20 dL/g. In an embodiment, the RSV of the acrylic polymer is from about 23 dL/g to about 32 dL/g.

In an embodiment of the present invention, the water treatment method may further include adding the present inverse emulsion polymer to an industrial water system and retrieving or otherwise collecting a condensate from the industrial water system. The condensate is typically an aqueous solution. In a further embodiment, the collection of the condensate may occur as the inverse emulsion polymer is added as a flocculant during the settling phase in a mineral extraction process, such as the Bayer process, for example.

As is commonly known in the mineral extraction art, the condensate may be recycled back into the extraction process. Alternatively, the condensate may be delivered to a second industrial water system. Nonlimiting examples of suitable industrial water systems to which the condensate may be delivered include a boiler system, a waste water treatment system and a mineral extraction system. In an embodiment, the second industrial water system may be a boiler system. In this situation, the elevated temperature of the condensate may be used to heat and/or power other systems and/or facilities.

Low boiling hydrocarbons present in the oil phase of conventional hydrocarbon-based inverse emulsion polymers tend to collect in the condensate as is commonly known in the art. This is problematic as these hydrocarbons may have a detrimental impact on any second industrial water system that receives the condensate. The hydrocarbon oil components that distill over into the condensate may coat piping and other internal surfaces causing flow restriction and other problems in the second industrial water system such as a boiler system, for example.

A further advantage of applying the present inverse emulsion polymer to a mineral extraction system wherein a condensate is retrieved is that the hydrolysis of the vegetable-derived oil to a fatty acid in the initial industrial water essentially ensures that substantially no oil, oil components or fatty acid report to the condensate. Thus, during collection of the condensate, substantially all of the fatty acid remains in the initial industrial water system yielding a condensate substantially free of any oil components and/or fatty acid components. It has been found that the alcohol product of the oil hydrolysis may report to or otherwise accumulate in the condensate. This typically has little or no impact upon the second industrial water system, such as a boiler system for example, as the alcohol is readily dissolved in the condensate.

In the Bayer process, for example, pulverized bauxite ore is fed to a slurry mixer where a caustic slurry is prepared. The caustic soda solution dissolves oxides of aluminum. The bauxite ore slurry is diluted and passed through a digester or a series of digesters where, under high pressure and temperature, a high percentage of the total available alumina is released from the ore as caustic-soluble sodium aluminate. After digestion, the slurry passes through several flash tanks wherein the temperature and pressure of the digested slurry is reduced.

The aluminate slurry leaving the flashing operation, generally referred to as primary settler feed, typically contains about 1 to 20 weight percent caustic-insoluble constituents of bauxite ore solids (referred to as "red mud"), which consists of the insoluble residue that remains after, or is precipitated during, digestion. The finer solids are generally separated from the liquor first by gravity settling or sedimentation aided by a flocculant and then filtration, if necessary. Once separated, alumina trihydrate is precipitated from the aqueous sodium hydroxide and collected as product.

Conventional hydrocarbon-based inverse emulsion polymers used as flocculants to separate the red mud from the liquor are disadvantageous for several reasons. Conventional hydrocarbon-based flocculants contain a substantial amount of oil as the carrier causing the liquor from which the alumina separates out to become enriched with increasing amounts of organic material. These organics in the liquor may inhibit the precipitation of alumina. In addition, residual hydrocarbon-based oils of conventional emulsions become volatile during the flashing or liquor evaporation processes increasing the risk of explosion and contamination of the condensate.

Similarly, the digested slurry is typically discharged from the flash tanks at elevated temperatures. The primary settler feed is generally not further cooled before charging to the primary settlement stage. Thus, the liquor during the settling process may be at an elevated temperature (e.g., a temperature above ambient temperature) and may be anywhere from about 80° C. to about 120° C. These elevated temperatures increase the vapor pressure of conventional hydrocarbon-based emulsions which causes the condensate to be contaminated with the hydrocarbon-based oil.

In a further embodiment, the inverse emulsion polymer may be used to flocculate suspended particles in the settling stage of the Bayer process. The flocculating material may be the non-continuous aqueous acrylic polymer solution as previously discussed. The present invention provides several advantages over conventional hydrocarbon-based flocculants used in the alumina extraction industry. As previously discussed, the Bayer slurry is caustic (e.g., pH from about 9 to about 14) and typically at an elevated temperature of from about 80° C. to 120° C. when the flocculant is applied to clarify the liquor. Adding the present inverse emulsion polymer to the Bayer slurry under these conditions readily hydrolyzes the ester of a fatty acid and a water-soluble alcohol to a fatty acid salt and an alcohol such as methanol, for example, both components being soluble or otherwise dissolved in the liquor. The hydrolysis of the ester results in a soluble, non-volatile fatty acid salt that imparts substantially no vapor pressure. The present inverse emulsion polymer thereby provides a safe and effective flocculant by reducing the stress on the system and substantially eliminating the risk of explosion and contamination of the condensate.

A further advantage of the present invention is that the fatty acid salt does not accumulate as organic material in the liquor as occurs with conventional hydrocarbon-based flocculants. Rather, the fatty acid salt settles out of solution with the mud during flocculation.

In another embodiment, the water treatment method includes adding the inverse emulsion polymer of the present invention to a high pressure decantation mineral extraction system and flocculating the suspended particles with the non-continuous phase.

High Pressure Decantation (HPD), also referred to as double digestion, is clarification technology used in the alumina extraction industry that has gained recent attention as an improved method for alumina recovery. HPD overcomes many of the drawbacks of traditional alumina extraction such as boehmite reversion, quartz attack and caustic losses. HPD avoids these problems with the use of pressurized mud separation essentially at digestion temperature.

In HPD, bauxite is fed into a first digester to extract most of the alumina trihydrate, leaving behind impurities which may include other alumina bearing constituents. The slurry is subsequently sent to a pressure decanter. Separation of the slurry is performed at essentially digestion conditions. The inverse emulsion polymer of the present invention may then be added to the slurry in the pressure decanter to flocculate the suspended particles. The temperature of the slurry in the pressure decanter may be from about 120° C. to about 250° C. The pressure in the decanter may be from about 1 atmosphere to about 30 atmospheres.

The slurry from the pressure decanter may be delivered to another digester operating at a high temperature, typically between about 165° C. to about 200° C., for the extraction of the remainder of the alumina.

In a further embodiment, the inverse emulsion polymer may be added to separate the mud obtained from the second digester.

By way of example and not limitation, examples of the present invention will now be given.

Inverse Emulsion Polymer Formula

|  | Wt % (Formula) | Wt (g) (1000 g) |
|---|---|---|
| Monomer Phase |  |  |
| Water | 12.124 | 121.2395 |
| 67% Ammonium Acrylate | 58.854 | 588.5375 |
| Versene (EDTA) | 0.008 | 0.0790 |
| Oil Phase |  |  |
| Soygold 1100 (soy methyl ester solvent) | 25.426 | 254.2590 |
| Span 85 (Sorbitane trioleate) | 1.400 | 14.0000 |
| Tween 81 (Polyoxyethylenesorbitan monooleate) | 0.100 | 1.0000 |
| Hypermer B-210 (polymeric surfactant) | 0.500 | 5.0000 |
| Polymerization Initiator (non-continuous phase) |  |  |
| Vazo 64 (2,2'-azobisisobutyronitrile) | 0.041 | 0.4100 |
| Vazo 52 (2,2'-azobis(2,4-dimethylvaleronitrile) | 0.003 | 0.0250 |
| Sodium Hypophosphite | 0.038 | 0.3800 |
| Water | 0.057 | 0.5700 |
| Additives: |  |  |
| 55% Ammonium Thiocyanate | 1.450 | 14.5000 |
| Total | 100.000 | 1000.0000 |

| Oil Phase Composition | Bonding | Percent of Composition | Percent $O_2$ |
|---|---|---|---|
| Methyl Palmitate | C-16 | 10.0 | 11.8 |
| Methyl Stearate | C-18 | 04.0 | 10.7 |
| Saturated % |  | 14.0 |  |
| Methyl Oleate | C-18=1 | 25.0 | 10.8 |
| Methyl Linoleate | C-18=2 | 53.0 | 10.9 |
| Methyl Linolenate | C-18=3 | 08.0 | 10.9 |
| Unsaturated % |  | 86.0 |  |
| Total Avg. % $O_2$ |  |  | 11.0 |

A 39.8% ammonium acrylate latex in methyl soyate continuous phase was prepared in the following manner. To a 2000 ml reaction flask equipped with a mechanical stirrer, RTD, nitrogen purge tube, condenser and a means to heat and cool, solution A was made up by adding 254.2590 grams of Soygold 1100, 14.0 grams of Span 85, 1 gram of Tween 81, 0.5 grams Hypermer B-210. This mixture was heated to 60° C. to disperse all components. In a separate vessel (a 1000 ml flask) Solution B was made by adding 121.2395 grams of water, 588.5375 grams of a 67.00% solution of ammonium acrylate monomer previously made from ammonia and acrylic acid, and 0.0790 grams of Versene. The pH of this solution was adjusted to 7.2.

An emulsion was then made of the two phases by slowly adding solution B to solution A while mixing. The crude emulsion was then emulsified for 60 seconds by means of a high speed "homogenizer" such as IKA T25 fitted with a medium type generator. The temperature of this emulsion was adjusted to 42° C.

The initiators Vazo® 64 and Vazo® 52 were then added. Nitrogen purge was started and the reaction mixture was controlled at 42° C. for 5 hours and conversion followed by density. At 90 to 95% conversion, the solution of sodium hypophosphite was added. The reaction was heated to 50° C. and held at 50° C. for two hours. The reaction was then cooled and the product filtered through a 100-mesh screen. The product was a smooth emulsion with methyl soyate as the continuous phase. RSV of this product was measured at 0.040% polymer in 2 molar $NaNO_3$. The product had an RSV of 30.67.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. An inverse emulsion polymer for use in liquor clarification comprising:
   a non-continuous phase comprising an aqueous solution of an acrylic polymer composed of monomers selected from the group consisting of (meth)acrylic acid and its salts;
   a continuous phase composed solely of an ester of a fatty acid and a $C_1$-$C_4$ water-soluble alcohol,
   an oil-soluble/water-insoluble surfactant,
   an emulsifier having a HLB of about 1.5 to about 7.5, and
   an emulsifier having a HLB of about 9 to about 16.

2. The emulsion polymer of claim 1 wherein the ester of a fatty acid and a $C_1$-$C_4$ water-soluble alcohol is selected from the group consisting of fatty acid methyl ester oils, soya oil, methylated soya oil, ethylated soya oil, methyl soyate, ethyl soyate, methyl palmitate, methyl stearate, methyl oleate, methyl linolate, methyl linolenate, laurate-based oils, castor oil, linseed oil, coconut oil, corn oil, cottonseed oil, neatsfoot oil, olive oil, palm oil, peanut oil, rapeseed oil, safflower oil, sesame seed oil, sperm oil, sunflower oil, tall oil, tallow, and combinations thereof.

3. The emulsion polymer of claim 1 wherein the continuous phase is composed solely of a vegetable-derived oil.

4. The emulsion polymer of claim 3 wherein the vegetable derived oil is selected from the group consisting of a fatty acid methyl ester oil, soya oil, methylated soya oil, ethylated soya oil, methyl soyate, ethyl soyate, methyl palmitate, methyl stearate, methyl oleate, methyl linolate, methyl linolenate, laurate based oils and combinations thereof.

5. The emulsion polymer of claim 1 wherein the ester of a fatty acid and a $C_1$-$C_4$ water-soluble alcohol is selected from the group consisting of methyl and ethyl esters of $C_{16}$-$C_{18}$ fatty acids and combinations thereof.

6. The emulsion polymer of claim 1 wherein the surfactant is selected from the group consisting of a polyoxyalkylene modified block copolymer, a polyisobutylene derivative with polyoxyalkene end groups, and combinations thereof.

7. The emulsion polymer of claim 1 wherein the low HLB emulsifier is selected from the group consisting of a sorbitan fatty acid ester, a sorbitan oleic acid ester and combinations thereof.

8. The emulsion polymer of claim 1 wherein the low HLB emulsifier has a HLB value from about 2 to about 6.

9. The emulsion polymer of claim 1 wherein the high HLB emulsifier is selected from the group consisting of polyoxyethylene sorbitan laurate, polyoxyethylene sorbitan palmitate, polyoxyethylene sorbitan stearate, polyoxyethylene sorbitan oleate, and combinations thereof.

10. The emulsion polymer of claim 1 wherein the emulsion polymer has an RSV value of from about 10 to about 50 dL/g.

11. The emulsion polymer of claim 1 wherein the emulsion polymer has an RSV value of at least 10 dL/g.

12. The emulsion polymer of claim 1 wherein the emulsion polymer has an RSV value of at least about 20.

13. The emulsion polymer of claim 1 wherein the emulsion polymer has an RSV value of from about 23 to about 32 dL/g.

14. A method of producing an inverse emulsion polymer for use in liquor clarification comprising:

adding an aqueous solution of one or more monomers selected from the group consisting of (meth)acrylic acid and its salts, to an oil phase composed solely of an ester of a fatty acid and a $C_1$-$C_4$ water-soluble alcohol, an emulsifier having a HLB of about 9 to about 16, an emulsifier having a HLB of about 1.5 to about 7.5, and an oil-soluble/water-insoluble surfactant; and initiating polymerization to form the inverse emulsion polymer.

* * * * *